US012609318B2

(12) United States Patent

Yue et al.

(10) Patent No.: US 12,609,318 B2

(45) Date of Patent: Apr. 21, 2026

(54) LITHIUM-ION BATTERY POSITIVE ELECTRODE LITHIUM SUPPLEMENT ADDITIVE, PREPARATION METHOD THEREFOR, AND LITHIUM-ION BATTERY

(71) Applicant: SHENZHEN YANYI NEW MATERIALS CO., LTD., Guangdong (CN)

(72) Inventors: Min Yue, Guangdong (CN); Fan Xia, Guangdong (CN); Junqi Chen, Guangdong (CN)

(73) Assignee: SHENZHEN YANYI NEW MATERIALS CO., LTD., Guangdong (CN)

( * ) Notice: Subject to any disclaimer, the term of this patent is extended or adjusted under 35 U.S.C. 154(b) by 575 days.

(21) Appl. No.: 18/007,346

(22) PCT Filed: Oct. 9, 2020

(86) PCT No.: PCT/CN2020/119884

§ 371 (c)(1),
(2) Date: Jan. 30, 2023

(87) PCT Pub. No.: WO2022/021608

PCT Pub. Date: Feb. 3, 2022

(65) Prior Publication Data

US 2023/0290949 A1 Sep. 14, 2023

(30) Foreign Application Priority Data

Jul. 29, 2020 (CN) .......................... 202010741703.5

(51) Int. Cl.
*H01M 4/62* (2006.01)
*C01G 53/42* (2025.01)
(Continued)

(52) U.S. Cl.
CPC .............. *H01M 4/62* (2013.01); *C01G 53/42* (2013.01); *H01M 4/131* (2013.01); *H01M 4/525* (2013.01);
(Continued)

(58) Field of Classification Search
CPC ........ C01G 53/42; H01M 4/62; H01M 4/485; H01M 4/525; H01M 10/4235; H01M 10/0525
See application file for complete search history.

(56) References Cited

U.S. PATENT DOCUMENTS

| | | | | | |
|---|---|---|---|---|---|
| 6,045,771 | A | * | 4/2000 | Matsubara | ............. C01G 53/42 429/231.1 |
| 2002/0061442 | A1 | * | 5/2002 | Yamaura | ............... H01M 4/485 429/231.1 |
| 2021/0265614 | A1 | | 8/2021 | Boram | |

FOREIGN PATENT DOCUMENTS

| CN | 108735526 | * 11/2018 |
|---|---|---|
| CN | 108987672 | 12/2018 |

(Continued)

OTHER PUBLICATIONS

English translation CN108735526 (Year: 2025).*

(Continued)

*Primary Examiner* — Jennifer Dieterle

(74) *Attorney, Agent, or Firm* — Ruggiero McAllister & McMahon LLC; Edward L McMahon

(57) ABSTRACT

A lithium-ion battery positive electrode lithium supplement additive, a preparation method, and a lithium-ion battery are provided. The additive has an $Li_2NiO_2$ purity that is greater than 95%, a total residual alkali less than 3%, an initial charge gram capacity of 420-465 mAh/g, and an irreversible capacity of 260-340 mAh/g. The method includes: preparing a composite lithium salt, mixing the composite lithium salt with a nickel source, sintering and crushing same, and (Continued)

obtaining the lithium-ion battery positive electrode lithium supplement additive. The additive is added to a positive electrode active material of the positive electrode of the lithium-ion battery. The $Li_2NiO_2$ obtained has a purity of greater than 95%, the total residual alkali is less than 3%, the initial charge gram capacity is 420-465 mAh/g, and the irreversible capacity is 260-340 mAh/g.

5 Claims, 4 Drawing Sheets

(51) Int. Cl.

| | | |
|---|---|---|
| *H01M 4/131* | (2010.01) | |
| *H01M 4/525* | (2010.01) | |
| *H01M 10/0525* | (2010.01) | |
| *H01M 4/02* | (2006.01) | |

(52) U.S. Cl.
CPC ..... *H01M 10/0525* (2013.01); *C01P 2002/72* (2013.01); *C01P 2004/03* (2013.01); *C01P 2004/61* (2013.01); *C01P 2006/40* (2013.01); *C01P 2006/80* (2013.01); *H01M 2004/021* (2013.01); *H01M 2004/028* (2013.01)

(56) References Cited

FOREIGN PATENT DOCUMENTS

| | | | |
|---|---|---|---|
| CN | 109148823 | A | 1/2019 |
| CN | 109786746 | * | 5/2019 |
| CN | 109786746 | A | 5/2019 |
| CN | 110137488 | A | 8/2019 |
| CN | 110218078 | * | 9/2019 |
| CN | 110218078 | A | 9/2019 |
| CN | 110690440 | A | 1/2020 |
| CN | 111029569 | A | 4/2020 |
| CN | 111162249 | A | 5/2020 |
| EP | 3629400 | A1 | 4/2020 |
| JP | 10316431 | * | 5/1997 |
| JP | 2020516039 | | 5/2020 |
| KR | 20080108723 | | 12/2008 |
| KR | 20100036896 | | 4/2010 |
| KR | 20130134949 | A | 12/2013 |
| KR | 20150079362 | | 7/2015 |
| KR | 20180074071 | * | 12/2016 |
| WO | WO2020080800 | A1 | 4/2020 |
| WO | 2020096212 | | 5/2020 |

OTHER PUBLICATIONS

English translation CN109786746 (Year: 2025).*
English Translation KR20180074071 (Year: 2025).*
English translation JP10316431 (Year: 2025).*
English Translation CN110218078 (Year: 2025).*
European Search Report from corresponding EP 20947573.0 dated Sep. 18, 2024.
First Office Action from corresponding JP 2023-504719 dated Feb. 9, 2024.
International Search Report from PCT/CN2020/119884 dated Feb. 3, 2022.
Machine Translation of Office Action from corresponding KR202010741703.5 dated Jul. 1, 2022.

* cited by examiner

LITHIUM-ION BATTERY POSITIVE ELECTRODE LITHIUM SUPPLEMENT ADDITIVE, PREPARATION METHOD THEREFOR, AND LITHIUM-ION BATTERY

TECHNICAL FIELD

The present application relates to a lithium-ion battery material, a preparation method therefor, and a lithium-ion battery, in particular to a lithium-ion battery positive electrode additive, a preparation method therefor, and a lithium-ion battery.

BACKGROUND

Lithium-ion batteries (batteries) are widely used in various electronic products due to their high energy density and long cycle life. With the rapid development of large-scale mobile power sources used in electric vehicles, electric machinery and unmanned aerial vehicles, higher requirements for high energy and high power are put forward.

In order to meet the design requirements of high specific energy batteries, the most effective approach is to select positive and negative electrode materials with high specific capacity, such as silicon, tin, aluminum, and oxides which can be used as novel negative electrode materials. However, during the initial charge process of the lithium battery, part of the lithium released from the positive electrode forms an irreversible lithium-containing passivation film SEI on the surface of the negative electrode, which causes the loss of active lithium and reduces the available energy of the battery.

In order to make up the lithium loss, the method in the prior art is to subject the positive or negative electrode to lithium pre-supplement. The negative electrode lithium supplement is generally to subject the negative electrode material to react with lithium metal powders, foils or sheets. However, this method has the problems that the chemical stability of the lithiation reagent is poor, and the active lithium powders have large safety hazards. The positive electrode lithium supplement is generally to mix the lithium supplement material with the positive electrode material in proportion and prepare the same into a battery cell after preparing the slurry; during the initial charge process, excess lithium is released to supplement the lithium consumed by the formation of SEI film on the negative electrode surface, thereby realizing lithium supplement. Compared with the negative electrode lithium supplement, the positive electrode lithium supplement has no need to change the existing battery production process, so that it has the characteristics of low cost, simplicity and high safety, and has more industrial application prospects. However, the preparation method for the positive electrode lithium supplement material in the prior art has the problem of a complicated process, and needs to go through multiple mixing, crushing and sintering processes, and the obtained positive electrode lithium supplement material has low purity and cannot meet the requirements of industrial production.

For example, the Chinese patent with Publication Ser. No. 108735526A discloses a preparation method for a lithium supplement material $Li_2NiO_2$ and a lithium-ion capacitor using the $Li_2NiO_2$; $Li_2O$ and NiO are used as raw materials, ball-milled in a protective atmosphere, sintered at high temperature, then added with $Al_2O_3$ and continuously ball-milled in a protective atmosphere, and then sintered at high temperature to obtain the target $Li_2NiO_2$; this method has a shortcoming that it is difficult to synthesize $Li_2NiO_2$ by high temperature sintering with $Li_2O$, NiO and $Al_2O_3$ as raw materials, the obtained $Li_2NiO_2$ contains many impurities, and it is difficult to improve the synthesis purity.

Additionally, for example, the Chinese patent with Publication Ser. No. 109786746A discloses a positive electrode sheet, a lithium-ion battery positive electrode lithium supplement material and a preparation method therefor; a positive electrode lithium supplement material matrix and a carbon source are mixed with ethanol as a solvent to obtain a mixed solution, and the mixed solution is volatilized to remove the solvent and then calcined in an inert atmosphere, so as to obtain the lithium-ion battery positive electrode lithium supplement material with carbon coated on the surface; the shortcoming is that it is extremely difficult to prepare lithium oxide with a purity of more than 99.9% by using $Li_2CO_3$ as a raw material, and the reproducibility is extremely poor, and additionally, the residual $Li_2CO_3$ content is high; and using such lithium source to prepare $Li_2NiO_2$ will result in a high content of carbonate radicals, which will adversely affect the processing and preparation of batteries and battery performance.

Besides, for example, the Chinese patent with Publication Ser. No. 110218078A discloses a lithium supplement material $Li_2NiO_2$, a preparation method therefor and use thereof, including the following steps: S1, mixing $Li_2O$, $Ni_2CO_3$, and $Al(OH)_3$, which are used as raw materials, with acetone as a solvent and then ball-milling the same in a protective atmosphere; S2, drying the ball-milled product to obtain a powder; S3, pre-sintering the powder at a low temperature in a protective atmosphere; S4, ball-milling the pre-sintered product in a protective atmosphere, and pressing the ball-milled product into a tablet; S5, sintering the product obtained in S4 at high temperature, so as to obtain the target lithium supplement material $Li_2NiO_2$; this method needs multiple sintering for preparation, and involves the use of organic acetone as a solvent, the complex process is not easy to be applied to mass production, and it is easy to cause environmental pollution.

SUMMARY

The present application provides a lithium-ion battery positive electrode lithium supplement additive, a preparation method therefor and a lithium-ion battery, and a problem to be solved is to improve the $Li_2NiO_2$ purity and reduce the cost.

The present application adopts the following technical solution: a lithium-ion battery positive electrode lithium supplement additive, in which a $Li_2NiO_2$ purity is more than 95%, a total residual alkali content is less than 3%, an initial charge gram capacity is 420-465 mAh/g, and an irreversible capacity is 260-340 mAh/g.

The lithium-ion battery positive electrode lithium supplement additive of the present application is prepared by the following preparation method including:

step 1: preparing a composite lithium salt a lithium raw material is heated from room temperature to 400-950° C. at a heating rate of 1-10° C./min under a vacuum degree of less than 100 pa, held at the temperature for 15-480 min, and naturally cooled to the room temperature in the furnace; the product is subjected to a ball milling at a rotation speed of 700 rpm with a ball-material mass ratio of 10-15:1 for 0.5 h by using zirconium balls with a diameter of 5 mm, so as to obtain the composite lithium salt $xLiOH \cdot yLi_2O \cdot zLi_2CO_3 \cdot wH_2O$, in which x, y and z are mass proportion, $0<x<0.5$, $0.5\leq y<1.0$, $0<z<0.5$, $x+y+z=1$, w represents a crystal water content, and $0\leq w\leq 1$;

the lithium raw material is at least one of a lithium hydroxide-lithium oxide-lithium carbonate composite, a lithium hydroxide-lithium oxide-lithium oxalate composite, a lithium hydroxide-lithium peroxide-lithium carbonate composite, a lithium hydroxide-lithium peroxide-lithium oxalate composite, a lithium hydride-lithium oxide-lithium carbonate composite, a lithium hydride-lithium oxide-lithium oxalate composite, a lithium hydride-lithium peroxide-lithium carbonate composite, and a lithium hydride-lithium peroxide-lithium oxalate composite;

step 2: mixing the composite lithium salt with a nickel source the composite lithium salt is mixed with the nickel source at a rotation speed of 500-1000 rpm with a lithium source-nickel source molar ratio of 1.5-2.2:1.0 for 0.5-6.0 h under an argon or nitrogen protective atmosphere, so as to obtain a mixed powder of the composite lithium salt and the nickel source;

the nickel source is at least one of nickelous oxide, dinickel trioxide, nickel dioxide, nickel hydroxide, nickel oxide hydroxide, nickel carbonate, nickel oxalate and nickel acetate;

step 3: sintering under a protective atmosphere or an oxidizing atmosphere, the mixed powder of the composite lithium salt and the nickel source is heated to 100-300° C. at a heating rate of 1-10° C./min, held at the temperature for 0.5-5.0 h, then heated to 600-800° C. at a heating rate of 1-10° C./min, held at the temperature for 5.0-20.0 h for a high-temperature sintering, and naturally cooled to the room temperature in the furnace, so as to obtain a sintered material;

step 4: crushing the sintered material is crushed at a rotation speed of 800-1000 rpm for 15-30 min under an argon or nitrogen protective atmosphere, pulverized, and sieved by a 350-400 mesh screen, in which a particle size D50 is 5.0-15.0 µm, and Dmax is less than 25.0 µm, so as to obtain a pulverized material;

step 5: removing a magnetic substance the magnetic substance is removed from the pulverized material to ensure that a magnetic substance content is less than 50 ppb, so as to obtain the lithium-ion battery positive electrode lithium supplement additive.

The lithium raw material of the step 1 has a mass purity of more than 99%; the argon or nitrogen of the step 2 has a purity of more than 99.995% and a flow rate of 6 L/min; the protective atmosphere of the step 3 is at least one of argon or nitrogen, a gas purity is more than 99.995%, and a flow rate is 6 L/min, and the oxidizing atmosphere is a protective atmosphere with an oxygen content of 50-200 ppm; the argon or nitrogen of the step 4 has a purity of more than 99.995% and a flow rate of 6 L/min.

The sieving of the step 4 is performed with a 350-400 mesh screen, a particle size D50 is 5.0-15.0 µm, and Dmax is less than 25.0 µm.

A preparation method for a lithium-ion battery positive electrode lithium supplement additive including:

step 1: preparing a composite lithium salt a lithium raw material is heated from room temperature to 400-950° C. at a heating rate of 1-10° C./min under a vacuum degree of less than 100 pa, held at the temperature for 15-480 min, naturally cooled to the room temperature with the vacuum degree kept in the furnace, then taken out and crushed, so as to obtain the composite lithium salt $xLiOH\cdot yLi_2O\cdot zLi_2CO_3\cdot wH_2O$, in which x, y and z are mass proportion, $0<x<0.5$, $0.5\leq y<1.0$, $0<z<0.5$, $x+y+z=1$, w represents a crystal water content, and $0\leq w\leq 1$;

the lithium raw material is at least one of a lithium hydroxide-lithium oxide-lithium carbonate composite, a lithium hydroxide-lithium oxide-lithium oxalate composite, a lithium hydroxide-lithium peroxide-lithium carbonate composite, a lithium hydroxide-lithium peroxide-lithium oxalate composite, a lithium hydride-lithium oxide-lithium carbonate composite, a lithium hydride-lithium oxide-lithium oxalate composite, a lithium hydride-lithium peroxide-lithium carbonate composite, and a lithium hydride-lithium peroxide-lithium oxalate composite;

step 2: mixing the composite lithium salt with a nickel source the composite lithium salt is mixed with the nickel source at a rotation speed of 500-1000 rpm with a lithium source-nickel source molar ratio of 1.5-2.2:1.0 for 0.5-6.0 h under an argon or nitrogen protective atmosphere, so as to obtain a mixed powder of the composite lithium salt and the nickel source;

the nickel source is at least one of nickelous oxide, dinickel trioxide, nickel dioxide, nickel hydroxide, nickel oxide hydroxide, nickel carbonate, nickel oxalate and nickel acetate;

step 3: sintering under a protective atmosphere or an oxidizing atmosphere, the mixed powder of the composite lithium salt and the nickel source is heated to 100-300° C. at a heating rate of 1-10° C./min, held at the temperature for 0.5-5.0 h, then heated to 600-800° C. at a heating rate of 1-10° C./min, held at the temperature for 5.0-20.0 h, and naturally cooled to the room temperature in the furnace, so as to obtain a sintered material;

step 4: crushing the sintered material is crushed at a rotation speed of 800-1000 rpm for 15-30 min under an argon or nitrogen protective atmosphere, pulverized, and sieved by a 350-400 mesh screen, so as to obtain the lithium-ion battery positive electrode lithium supplement additive.

The method of the present application further includes removing a magnetic substance after the step 4 to ensure that a magnetic substance content is less than 50 ppb.

In the method of the present application, the crushing of the step 1 is a ball milling performed at a rotation speed of 700 rpm with a ball-material mass ratio of 10-15:1 for 0.5 h by using zirconium balls with a diameter of 5 mm.

In the method of the present application, the lithium raw material of the step 1 has a mass purity of more than 99%; the argon or nitrogen of the step 2 has a purity of more than 99.995% and a flow rate of 6 L/min; the protective atmosphere of the step 3 is at least one of argon or nitrogen, a gas purity is more than 99.995%, and a flow rate is 6 L/min, and the oxidizing atmosphere is a protective atmosphere with an oxygen content of 50-200 ppm; the argon or nitrogen of the step 4 has a purity of more than 99.995% and a flow rate of 6 L/min.

In the method of the present application, the sieving of the step 4 is performed with a 350-400 mesh screen, a particle size D50 is 5.0-15.0 µm, and Dmax is less than 25.0 µm.

A lithium-ion battery which is provided with a positive electrode; a positive electrode active material of the positive electrode is added with a lithium supplement additive, in which the lithium supplement additive is the lithium-ion battery positive electrode lithium supplement additive of the present application.

Compared with the prior art, the present application adopts a composite lithium salt as the lithium raw material, and after mixing, sintering and crushing, a $Li_2NiO_2$ purity is more than 95%, a total residual alkali content is less than 3%, an initial charge gram capacity is 420-465 mAh/g, and an irreversible capacity is 260-340 mAh/g; the preparation method is simple, easy to control, low in cost, and environmentally friendly, and facilitates industrial production.

DETAILED DESCRIPTION

Figure 1:
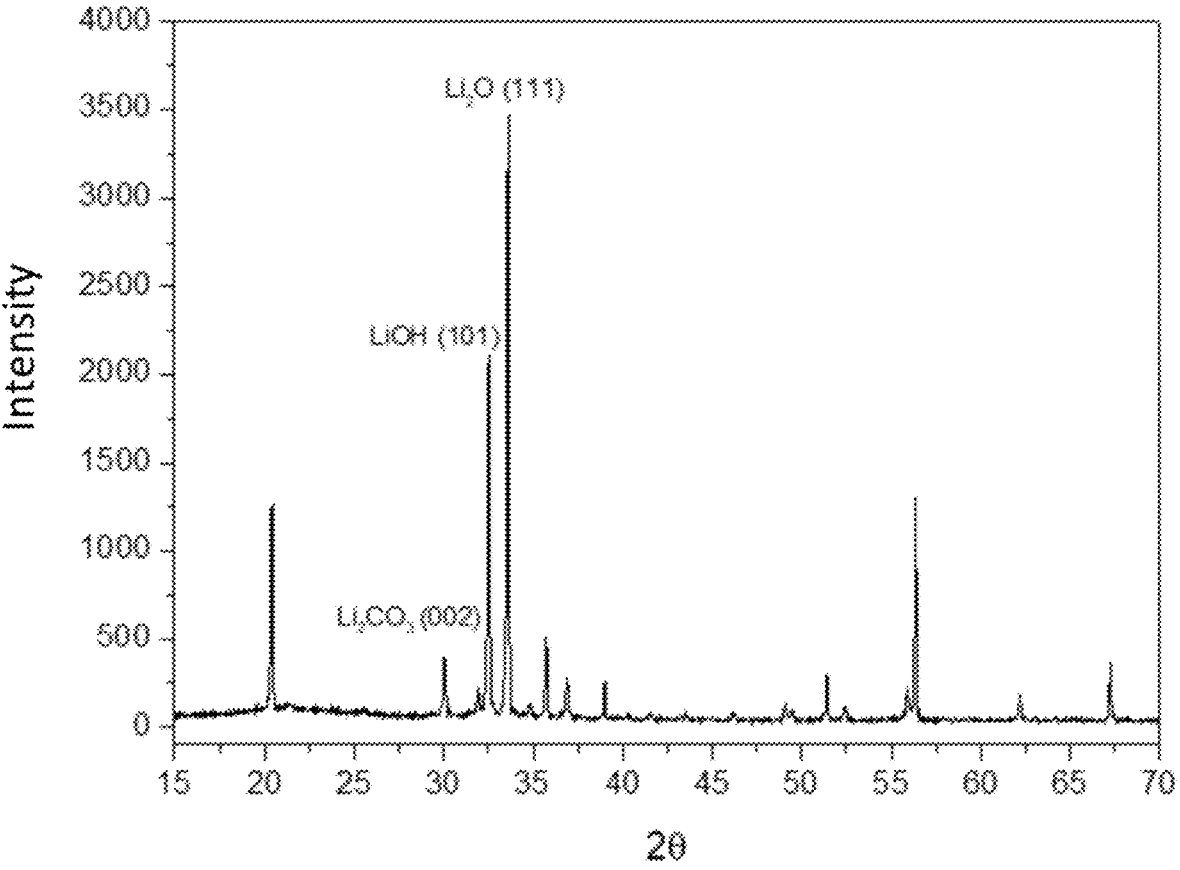
FIG. 1 is an XRD pattern of a composite lithium salt in Example 1 of the present application.

The present application will be further described in detail below with reference to the accompanying drawings and embodiments. A preparation method for the lithium-ion battery positive electrode lithium supplement additive $Li_2NiO_2$ of the present application includes the following steps:

Step 1: Preparing a Composite Lithium Salt

The composite lithium salt is $xLiOH \cdot yLi_2O \cdot zLi_2CO_3 \cdot wH_2O$, a mixture, in which x, y and z are mass proportion, $0 < x < 0.5$, $0.5 \leq y < 1.0$, $0 < z < 0.5$, $x+y+z=1$, w represents a crystal water content, and $0 \leq w \leq 1$.

A lithium raw material is at least one of a lithium hydroxide-lithium oxide-lithium carbonate composite, a lithium hydroxide-lithium oxide-lithium oxalate composite, a lithium hydroxide-lithium peroxide-lithium carbonate composite, a lithium hydroxide-lithium peroxide-lithium oxalate composite, a lithium hydride-lithium oxide-lithium carbonate composite, a lithium hydride-lithium oxide-lithium oxalate composite, a lithium hydride-lithium peroxide-lithium carbonate composite, and a lithium hydride-lithium peroxide-lithium oxalate composite, and has a mass purity of more than 99%. The composite refers to a mechanical mixture. The lithium raw material in the embodiments of the present application adopted the battery-grade lithium raw material of Jiangxi Ganfeng Lithium Co., Ltd.

The lithium raw material is heated from room temperature (20° C.) to 400-950° C. at a heating rate of 1-10° C./min under a vacuum degree of less than 100 pa, held at the temperature for 15-480 min, naturally cooled to the room temperature with the vacuum degree in the furnace kept, and taken out the sample which is a solid lump, and the sample is subjected to crushing by a ball milling performed at a rotation speed of 700 rpm with a ball-material mass ratio of 10-15:1 for 0.5 h by using zirconium balls with a diameter of 5 mm, so as to obtain the composite lithium salt $xLiOH \cdot yLi_2O \cdot zLi_2CO_3 \cdot wH_2O$.

By being held at the controlled temperature and time, the lithium raw material is decomposed and converted into the composite lithium salt (lithium source) containing lithium oxide, lithium hydroxide, and lithium carbonate which meets the proportion requirement, and thus in a sintering process of step 3, a reaction between lithium oxide and nickel source, such as $Li_2O + NiO = Li_2NiO_2$, can be realized most easily, which is also the key to prepare the lithium-ion battery positive electrode lithium supplement additive by sintering. For sintering of step 3, when a temperature is more than 450° C., lithium hydroxide will melt into a liquid, which will bring a certain fluidity to the mixed composite lithium salt and nickel source, drive the composite lithium salt to diffuse, and increase the contact between the composite lithium salt and the nickel source, so that the reaction, such as $Li_2O + NiO = Li_2NiO_2$, and $LiOH + NiO = Li_2NiO_2 + H_2O$, is more complete; meanwhile, the presence of a micro amount of lithium carbonate facilitates lithium hydroxide and lithium oxide diffusing synergistically during the sintering process.

Step 2: Mixing the Composite Lithium Salt with a Nickel Source

The composite lithium salt $xLiOH \cdot yLi_2O \cdot zLi_2CO_3 \cdot wH_2O$ is mixed with the nickel source at a rotation speed of 500-1000 rpm with a lithium source-nickel source molar ratio of 1.5-2.2:1.0 for 0.5-6.0 h under an argon or nitrogen protective atmosphere, so as to obtain a mixed powder of the composite lithium salt and the nickel source.

The nickel source is at least one of nickelous oxide, dinickel trioxide, nickel dioxide, nickel hydroxide, nickel oxide hydroxide, nickel carbonate, nickel oxalate and nickel acetate.

The argon or nitrogen has a purity of more than 99.995% and a flow rate of 6 L/min.

The lithium source and the nickel source are fully mixed so that the lithium and nickel components are distributed uniformly, which can improve the degree of diffusion reaction between lithium and nickel during the sintering process, and improve the purity of the lithium-ion battery positive electrode lithium supplement additive.

Step 3: Sintering

Under a protective atmosphere or an oxidizing atmosphere, the mixed powder of the composite lithium salt and the nickel source is heated to 100-300° C. at a heating rate of 1-10° C./min, held at the temperature for 0.5-5.0 h, for removing the residual moisture and volatiles from the mixed powder and reducing a residual alkali; then, the mixed powder is heated to 600-800° C. at a heating rate of 1-10° C./min, held at the temperature for 5.0-20.0 h for a high-temperature sintering to ensure that the composite lithium salt and the nickel source have reacted completely, and then naturally cooled to the room temperature under the protective atmosphere or the oxidizing atmosphere in the furnace, so as to obtain a sintered material.

The protective atmosphere is at least one of argon or nitrogen, a gas purity is more than 99.995%, and a flow rate is 6 L/min. The oxidizing atmosphere is a protective atmosphere with an oxygen content of 50-200 ppm.

During the sintering process, when a temperature is more than 450° C., lithium hydroxide will melt into a liquid, which will bring a certain fluidity to the mixed powder, drive the lithium source to diffuse, and increase the contact between the lithium oxide and the nickel source, so that the reaction is more complete; meanwhile, the presence of a micro amount of lithium carbonate facilitates lithium hydroxide and lithium oxide diffusing synergistically during the sintering process. In view of those facts, it is necessary to prepare the composite lithium salt in step 1, reasons of which are as follows: (1) if $Li_2O$ is solely used as the lithium source, the $Li_2O$, an inorganic oxide, will be in a solid state during the whole sintering process due to its melting point as high as 1567° C., and the provided lithium will react only by solid-phase diffusion reaction, which has slow kinetics and a limited reaction degree; (2) if LiOH is solely used as the lithium source, it will release a large amount of water during the sintering process, resulting in that the final product $Li_2NiO_2$ seriously hardens and is difficult to process, which greatly reduces the purity of the final product $Li_2NiO_2$ and increases the residual alkali content; (3) if the mixed raw materials $Li_2O+LiOH+Li_2CO_3$ is used directly as the lithium raw material without sintering, the raw materials of $Li_2O$, LiOH, and $Li_2CO_3$ are still separated substances, which cannot play a good synergistic effect in the sintering process, and when the melted LiOH flows, only restricted diffusion area of lithium source can be brought, and the lithium source provided by $Li_2O$ is still in a solid-phase diffusion state.

Step 4: Crushing

The sintered material is crushed by a 1000-type high-speed mixer of Wuxi Xinguang Powder Technology Co., Ltd. under an argon or nitrogen protective atmosphere, in which a rotation speed is 800-1000 rpm and a time is 15-30 min, and pulverized by a 350-type mechanical pulverizer of Yixing Jingxin Powder Machinery Equipment Co., Ltd. under an argon or nitrogen protective atmosphere, and sieved by a 350-400 mesh screen by using a vibrating screener of Xinxiang Weiliang Screening Machinery Co., Ltd., in which a particle size D50 is 5.0-15.0 μm, and Dmax is less than 25.0 μm, so as to obtain a pulverized material.

The argon or nitrogen has a purity of more than 99.995% and a flow rate of 6 L/min.

Step 5: Removing a Magnetic Substance

The magnetic substance is removed from the pulverized material by a magnetic separator to ensure that a magnetic substance content is less than 50 ppb, and the pulverized material after removing the magnetic substance is put in an aluminum plastic bag and packed by a vacuum sealing machine, so as to obtain the lithium-ion battery positive electrode lithium supplement additive $Li_2NiO_2$.

For the lithium-ion battery positive electrode lithium supplement additive prepared by the method of the present application, the morphology is observed through SEM characterization by an America US FEI inspect F50 scanning electron microscope; the material phase is obtained through the XRD pattern by an X'pert Pro X-ray diffractometer of the Netherlands PANalytical company, and then the component content is quantitatively analyzed by GSAS software, and the product purity and impurity content ratio are calculated; the residual alkali content of the material is detected by a Mettler G20S titrator; the particle size of the material is detected by a Sympatec dry particle size analyzer, and the magnetic substance content is detected by an ICP test.

The lithium-ion battery positive electrode lithium supplement additives obtained from examples and the lithium supplement additives obtained from comparative examples are separately used as positive electrode materials, and lithium sheets are used as negative electrode sheets, for preparing CR2032 button batteries, and the initial charge gram capacity and Coulombic efficiency are tested. The lower the Coulombic efficiency, the higher the irreversible capacity, and the better the effect of lithium supplement.

According to a mass ratio of lithium-ion battery positive electrode lithium supplement additive or lithium supplement additive:conductive agent SP:binder PVDF-85:5:10, an N-methylpyrrolidone (NMP) solution is prepared with a solid content of 30%, and the solution is stirred uniformly to obtain a positive electrode slurry, uniformly coated on an aluminum foil, dried under vacuum at 120° C. for 10 h, and punched into a round sheet with a diameter of 10 mm which is used as a positive electrode sheet. The positive electrode sheet, the negative electrode sheet which is a lithium metal sheet with a diameter of 16 mm, a separator film which is a Celgard 2400 microporous polypropylene film, and an electrolyte liquid which includes 1 mol/L $LiPF_6$/EC+DMC according to a volume ratio of 1:1 are assembled into a CR2032 button battery in an argon glove box.

The CR2032 button battery is charged at a constant current and constant voltage of 0.05C with a voltage range of 3.0-4.3 V and a constant temperature kept at 25° C., and tested for the charge gram capacity and discharge gram capacity, and the irreversible capacity (the initial charge capacity—the initial discharge capacity=the irreversible capacity) is calculated, and the initial Coulombic efficiency is calculated.

For the lithium-ion battery positive electrode lithium supplement additive of the present application, the $Li_2NiO_2$ mass purity is greater than 95%, the total residual alkali (residual lithium) is less than 3%, the initial charge gram capacity is 420-465 mAh/g, and the irreversible capacity is 260-340 mAh/g.

Example 1

Step 1: Preparing a Composite Lithium Salt

A lithium raw material $0.8LiOH$-$0.1Li_2O$—$0.1Li_2CO_3$ was heated to 650° C. at a heating rate of 6° C./min under vacuum environment with a vacuum degree of 30 pa, held at the temperature for 240 min, naturally cooled to the room temperature with the vacuum kept, then taken out, and pulverized by a ball milling at a rotation speed of 700 rpm with a ball-material ratio of 10:1 for 0.5 h by using zirconium balls with a diameter of 5 mm, so as to obtain the composite lithium salt, which was tested by XRD test and quantitatively analyzed by GSAS software for the component content, and the purity was calculated, and the composite lithium salt ratio was $0.193LiOH·0.788Li_2O·0.019Li_2CO_3$.

As shown in FIG. 1, the composite lithium salt phases of LiOH, $Li_2O$ and $Li_2CO_3$ were observed through the XRD test, in which the $2\theta=32.58°$ was assigned to the (101) plane of LiOH, the 20-33.61° was assigned to the (111) plane of $Li_2O$, and the 20-31.94° was assigned to the (002) plane of $Li_2CO_3$.

Step 2: Mixing the Composite Lithium Salt with a Nickel Source

According to a lithium source-nickel source molar ratio of 2.0:1.0, 327.3 g of the composite lithium salt and 746.9 g of nickelous oxide were weighed out, and mixed at a mixing rotation speed of 500 rpm for 0.5 h under a nitrogen protective atmosphere, so as to obtain a mixed powder of the composite lithium salt and the nickel source.

Step 3: Sintering

Under a nitrogen atmosphere, the mixed powder of the composite lithium salt and the nickel source was heated to 100° C. at a heating rate of 1° C./min, held at the temperature for 0.5 h, then heated to 600° C. at a heating rate of 1° C./min, held at the temperature for 20.0 h, and naturally cooled to the room temperature under the nitrogen atmosphere in the furnace, so as to obtain a sintered material.

Step 4: Crushing

The sintered material was crushed at a rotation speed of 800 rpm for 15 min under a nitrogen protective atmosphere, pulverized under a nitrogen protective atmosphere, and sieved by a 400 mesh screen, in which a particle size D50 was 8.0 μm and Dmax was 21.0 μm, so as to obtain the pulverized material.

Step 5: Removing a Magnetic Substance

The magnetic substance was removed from the pulverized material by a magnetic separator to ensure that a total magnetic substance content was 15 ppb, the pulverized material after removing the magnetic substance was put in an aluminum plastic bag and packed by a vacuum sealing machine, so as to obtain the lithium-ion battery positive electrode lithium supplement additive $Li_2NiO_2$.

Figure 2:
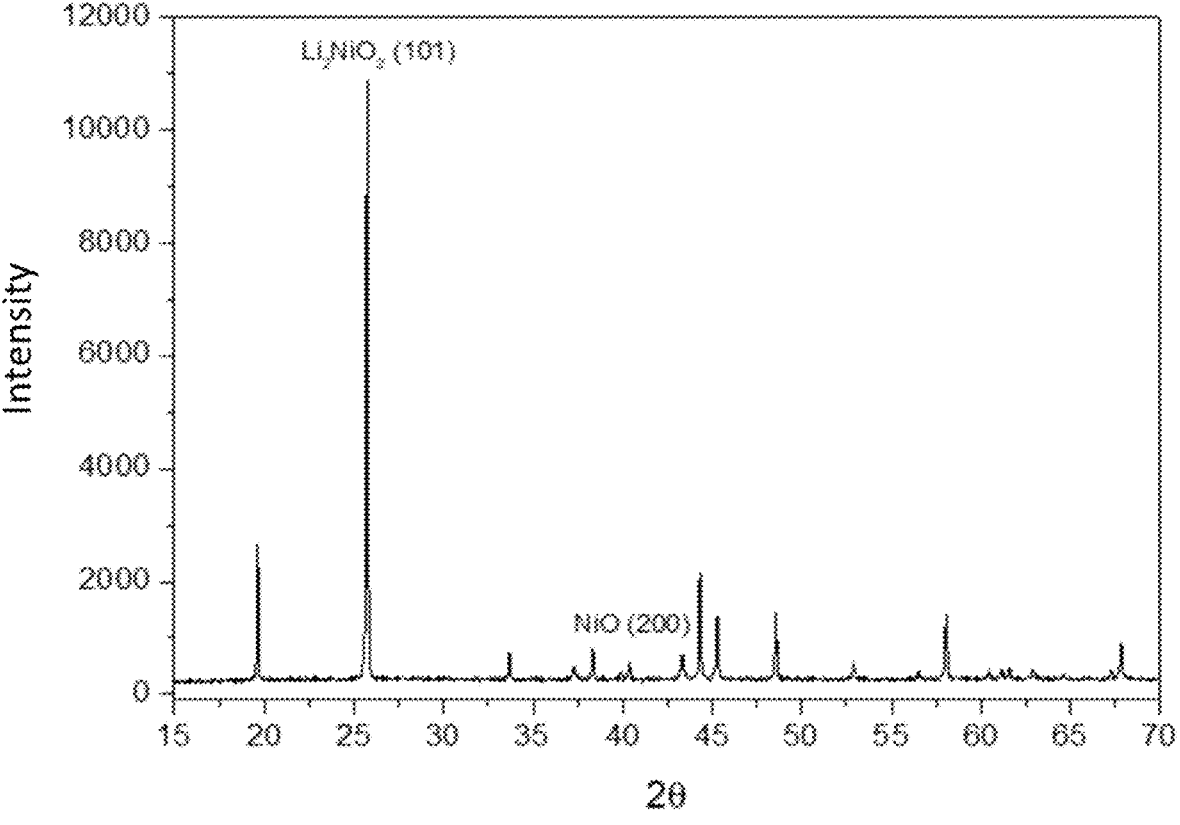
FIG. 2 is an XRD pattern of a lithium-ion battery positive electrode lithium supplement additive in Example 1 of the present application.
Figure 3:
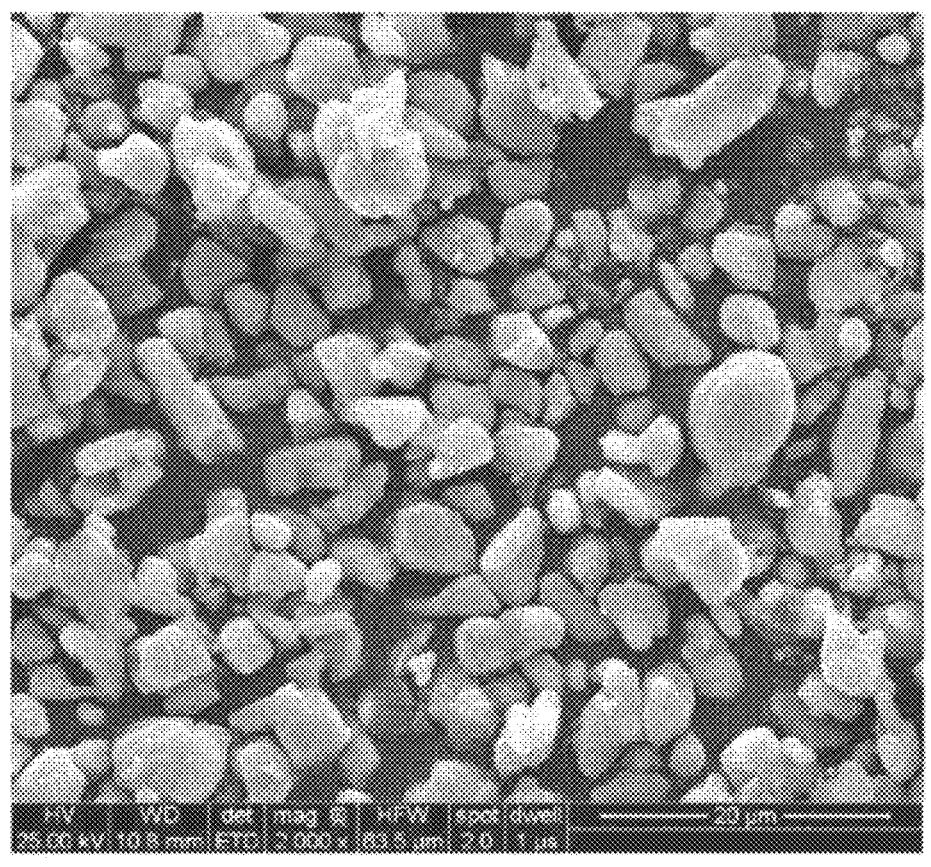
FIG. 3 is a SEM image of a lithium-ion battery positive electrode lithium supplement additive in Example 1 of the present application.

For the lithium-ion battery positive electrode lithium supplement additive $Li_2NiO_2$ in Example 1, as shown in FIG. 2, a diffraction peak of $Li_2NiO_2$ was mainly observed through the XRD test, in which the $2\theta=25.75°$ was assigned to the (101) plane of $Li_2NiO_2$, the $2\theta=43.38°$ was assigned to the (200) plane of NiO. The component content was quantitatively analyzed by GSAS software, and the $Li_2NiO_2$ component content was 97.5%. As shown in FIG. 3, the morphology was shown as monocrystalline spherical or rod-like particles, and a particle size was about 8.0 μm. A total residual alkali content was analyzed as 1.055% by a titrator. The test results are shown in Table 1.

Figure 4:
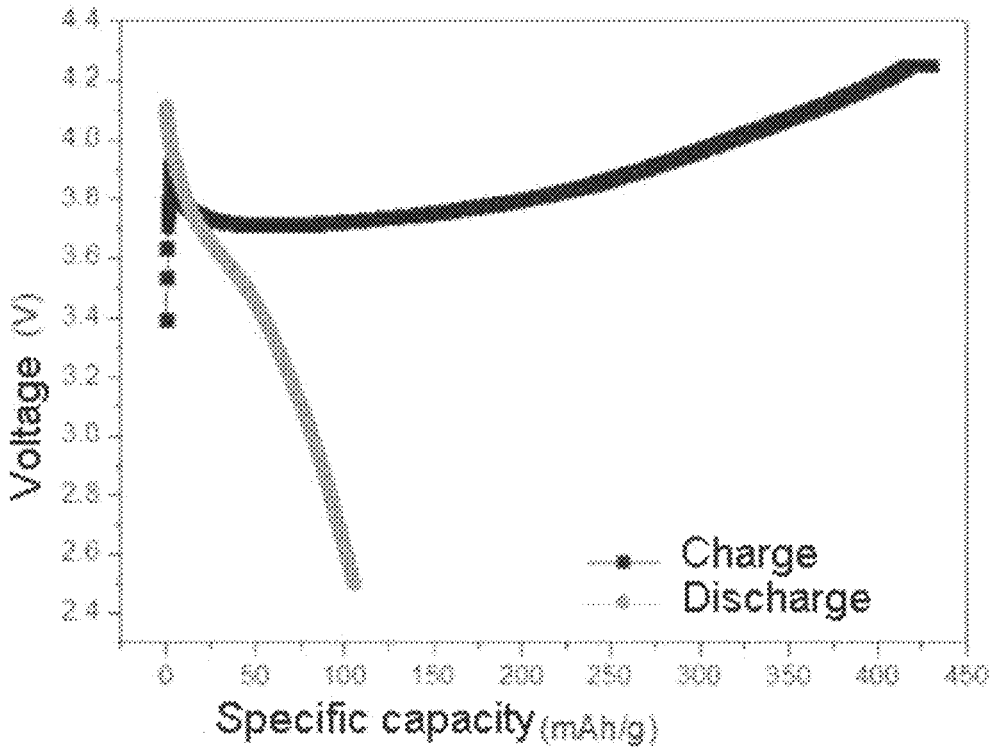
FIG. 4 is a charge-discharge curve diagram in Example 1 of the present application.

As shown in FIG. 4, after testing, the initial charge gram capacity of Example 1 was 430 mAh/g, the initial discharge gram capacity was 105 mAh/g, the available irreversible capacity was 325 mAh/g, and the initial Coulombic efficiency was 24.4%. The test results are shown in Table 1.

Example 2

Step 1: Preparing a Composite Lithium Salt

A lithium raw material $0.8LiOH-0.1Li_2O—0.1Li_2C_2O_4$ was heated to 950° C. at a heating rate of 5° C./min under vacuum environment with a vacuum degree of 90 pa, held at the temperature for 15 min, naturally cooled to the room temperature with the vacuum kept, then taken out, and pulverized by a ball milling at a rotation speed of 700 rpm with a ball-material ratio of 15:1 for 0.5 h by using zirconium balls with a diameter of 5 mm, so as to obtain the composite lithium salt, which was tested by XRD test and quantitatively analyzed by GSAS software for the component content, and the purity was calculated, and the composite lithium salt ratio was $0.068LiOH·0.900Li_2O·0.032Li_2CO_3$.

Step 2: Mixing the Composite Lithium Salt with a Nickel Source

According to a lithium source-nickel source molar ratio of 2.1:1.0, 335.7 g of the composite lithium salt and 926.9 g of nickel hydroxide were weighed out, and mixed at a mixing rotation speed of 1000 rpm for 2.0 h under an argon protective atmosphere, so as to obtain a mixed powder of the composite lithium salt and the nickel source.

Step 3: Sintering

Under an argon atmosphere, the mixed powder of the composite lithium salt and the nickel source was heated to 300° C. at a heating rate of 5° C./min, held at the temperature for 2.0 h, then heated to 750° C. at a heating rate of 5° C./min, held at the temperature for 20.0 h, and naturally cooled to the room temperature under the argon atmosphere in the furnace, so as to obtain a sintered material.

Step 4: Crushing

The sintered material was crushed at a rotation speed of 1000 rpm for 30 min under an argon protective atmosphere, pulverized under an argon protective atmosphere, and sieved by a 350 mesh screen, in which a particle size D50 was 5.0 μm and Dmax was 20.0 μm, so as to obtain the pulverized material.

Step 5: Removing a Magnetic Substance

The magnetic substance was removed from the pulverized material by a magnetic separator to ensure that a total magnetic substance content was 20 ppb, the pulverized material after removing the magnetic substance was put in an aluminum plastic bag and packed by a vacuum sealing machine, so as to obtain the lithium-ion battery positive electrode lithium supplement additive $Li_2NiO_2$.

For the lithium-ion battery positive electrode lithium supplement additive $Li_2NiO_2$ in Example 2, the $Li_2NiO_2$ component content was 97.9%. The total residual alkali content was analyzed as 2.119% by a titrator. The test results are shown in Table 1.

After testing, the initial charge gram capacity of Example 2 was 435 mAh/g, the initial discharge gram capacity was 150 mAh/g, the available irreversible capacity was 285 mAh/g, and the initial Coulombic efficiency was 34.5%. The test results are shown in Table 1.

Example 3

Step 1: Preparing a Composite Lithium Salt

A lithium raw material $0.8LiOH-0.1Li_2O_2-0.1Li_2CO_3$ was heated to 800° C. at a heating rate of 3° C./min under vacuum environment with a vacuum degree of 40 pa, held at the temperature for 60 min, naturally cooled to the room temperature with the vacuum kept, then taken out, and pulverized by a ball milling at a rotation speed of 700 rpm with a ball-material ratio of 15:1 for 0.5 h by using zirconium balls with a diameter of 5 mm, so as to obtain the composite lithium salt, which was tested by XRD test and quantitatively analyzed by GSAS software for the component content, and the purity was calculated, and the composite lithium salt ratio was $0.100LiOH·0.895Li_2O·0.005Li_2CO_3$.

Step 2: Mixing the Composite Lithium Salt with a Nickel Source

According to a lithium source-nickel source molar ratio of 2.2:1.0, 341.6 g of the composite lithium salt and 827.0 g of dinickel trioxide were weighed out, and mixed at a mixing rotation speed of 900 rpm for 1.0 h under an argon protective atmosphere, so as to obtain a mixed powder of the composite lithium salt and the nickel source.

Step 3: Sintering

Under an argon atmosphere, the mixed powder of the composite lithium salt and the nickel source was heated to 200° C. at a heating rate of 2° C./min, held at the temperature for 1.0 h, then heated to 700° C. at a heating rate of 2° C./min, held at the temperature for 15.0 h, and naturally cooled to the room temperature under the argon atmosphere in the furnace, so as to obtain a sintered material.

Step 4: Crushing

The sintered material was crushed at a rotation speed of 900 rpm for 20 min under an argon protective atmosphere, pulverized under an argon protective atmosphere, and sieved by a 400 mesh screen, in which a particle size D50 was 13.0 μm and Dmax was 23.0 μm, so as to obtain the pulverized material.

Step 5: Removing a Magnetic Substance

The magnetic substance was removed from the pulverized material by a magnetic separator to ensure that a total magnetic substance content was 18 ppb, the pulverized material after removing the magnetic substance was put in an aluminum plastic bag and packed by a vacuum sealing machine, so as to obtain the lithium-ion battery positive electrode lithium supplement additive $Li_2NiO_2$.

For the lithium-ion battery positive electrode lithium supplement additive $Li_2NiO_2$ in Example 3, the $Li_2NiO_2$ component content was 98.2%. The total residual alkali content was analyzed as 1.786% by a titrator. The test results are shown in Table 1.

After testing, the initial charge gram capacity of Example 3 was 465 mAh/g, the initial discharge gram capacity was 125 mAh/g, the available irreversible capacity was 340 mAh/g, and the initial Coulombic efficiency was 26.9%. The test results are shown in Table 1.

Example 4

Step 1: Preparing a Composite Lithium Salt

A lithium raw material $0.8LiOH\text{-}0.1Li_2O\text{—}0.1Li_2C_2O_4$ was heated to 700° C. at a heating rate of 10° C./min under vacuum environment with a vacuum degree of 20 pa, held at the temperature for 120 min, naturally cooled to the room temperature with the vacuum kept, then taken out, and pulverized by a ball milling at a rotation speed of 700 rpm with a ball-material ratio of 11:1 for 0.5 h by using zirconium balls with a diameter of 5 mm, so as to obtain the composite lithium salt, which was tested by XRD test and quantitatively analyzed by GSAS software for the component content, and the purity was calculated, and the composite lithium salt ratio was $0.116LiOH\cdot0.852Li_2O\cdot0.032Li_2CO_3$.

Step 2: Mixing the Composite Lithium Salt with a Nickel Source

According to a lithium source-nickel source molar ratio of 1.5:1.0, 243.6 g of the composite lithium salt and 906.9 g of nickel dioxide were weighed out, and mixed at a mixing rotation speed of 800 rpm for 3.0 h under a nitrogen protective atmosphere, so as to obtain a mixed powder of the composite lithium salt and the nickel source.

Step 3: Sintering

Under a nitrogen atmosphere, the mixed powder of the composite lithium salt and the nickel source was heated to 150° C. at a heating rate of 10° C./min, held at the temperature for 3.0 h, then heated to 850° C. at a heating rate of 10° C./min, held at the temperature for 5.0 h, and naturally cooled to the room temperature under the nitrogen atmosphere in the furnace, so as to obtain a sintered material.

Step 4: Crushing

The sintered material was crushed at a rotation speed of 850 rpm for 20 min under a nitrogen protective atmosphere, pulverized under a nitrogen protective atmosphere, and sieved by a 350 mesh screen, in which D50 was 10.0 μm and Dmax was 24.0 μm, so as to obtain the pulverized material.

Step 5: Removing a Magnetic Substance

The magnetic substance was removed from the pulverized material by a magnetic separator to ensure that a total magnetic substance content was 30 ppb, the pulverized material after removing the magnetic substance was put in an aluminum plastic bag and packed by a vacuum sealing machine, so as to obtain the lithium-ion battery positive electrode lithium supplement additive $Li_2NiO_2$.

For the lithium-ion battery positive electrode lithium supplement additive $Li_2NiO_2$ in Example 4, a $Li_2NiO_2$ component content was 96.3%. A total residual alkali content was analyzed as 2.785% by a titrator. The test results are shown in Table 1.

After testing, the initial charge gram capacity of Example 4 was 423 mAh/g, the initial discharge gram capacity was 110 mAh/g, the available irreversible capacity was 313 mAh/g, and the initial Coulombic efficiency was 26.0%. The test results are shown in Table 1.

Example 5

Step 1: Preparing a Composite Lithium Salt

A lithium raw material $0.4LiH\text{-}0.1Li_2O\text{—}0.5Li_2CO_3$ was heated to 400° C. at a heating rate of 1° C./min under vacuum environment with a vacuum degree of 10 pa, held at the temperature for 480 min, naturally cooled to the room temperature with the vacuum kept, then taken out, and pulverized by a ball milling at a rotation speed of 700 rpm with a ball-material ratio of 13:1 for 0.5 h by using zirconium balls with a diameter of 5 mm, so as to obtain the composite lithium salt, which was tested by XRD test and quantitatively analyzed by GSAS software for the component content, and the purity was calculated, and the composite lithium salt ratio was $0.075LiOH\cdot0.500Li_2O\cdot0.425Li_2CO_3.1H_2O$.

Step 2: Mixing the Composite Lithium Salt with a Nickel Source

According to a lithium source-nickel source molar ratio of 1.8:1.0, 450.1 g of the composite lithium salt and 916.9 g of nickel oxide hydroxide were weighed out, and mixed at a mixing rotation speed of 600 rpm for 4.0 h under a nitrogen protective atmosphere, so as to obtain a mixed powder of the composite lithium salt and the nickel source.

Step 3: Sintering

Under a nitrogen atmosphere, the mixed powder of the composite lithium salt and the nickel source was heated to 250° C. at a heating rate of 3° C./min, held at the temperature for 4.0 h, then heated to 690° C. at a heating rate of 3° C./min, held at the temperature for 8.0 h, and naturally cooled to the room temperature under the nitrogen atmosphere in the furnace, so as to obtain a sintered material.

Step 4: Crushing

The sintered material was crushed at a rotation speed of 950 rpm for 15 min under a nitrogen protective atmosphere, pulverized under a nitrogen protective atmosphere, and sieved by a 375 mesh screen, in which D50 was 12.0 μm and Dmax was 20.0 μm, so as to obtain the pulverized material.

Step 5: Removing a Magnetic Substance

The magnetic substance was removed from the pulverized material by a magnetic separator to ensure that a total magnetic substance content was 25 ppb, the pulverized material after removing the magnetic substance was put in an aluminum plastic bag and packed by a vacuum sealing machine, so as to obtain the lithium-ion battery positive electrode lithium supplement additive $Li_2NiO_2$.

For the lithium-ion battery positive electrode lithium supplement additive $Li_2NiO_2$ in Example 5, a $Li_2NiO_2$ component content was 97.2%. A total residual alkali content was analyzed as 1.901% by a titrator. The test results are shown in Table 1.

After testing, the initial charge gram capacity of Example 5 was 429 mAh/g, the initial discharge gram capacity was 125 mAh/g, the available irreversible capacity was 304 mAh/g, and the initial Coulombic efficiency was 29.1%. The test results are shown in Table 1.

Example 6

Step 1: Preparing a Composite Lithium Salt

A lithium raw material $0.8LiH\text{-}0.1Li_2O\text{—}0.1Li_2C_2O_4$ was heated to 550° C. at a heating rate of 8° C./min under vacuum environment with a vacuum degree of 70 pa, held at the temperature for 550 min, naturally cooled to the room temperature with the vacuum kept, then taken out, and pulverized by a ball milling at a rotation speed of 700 rpm with a ball-material ratio of 14:1 for 0.5 h by using zirconium balls with a diameter of 5 mm, so as to obtain the composite lithium salt, which was tested by XRD test and quantitatively analyzed by GSAS software for the component content, and the purity was calculated, and the composite lithium salt ratio was $0.418LiOH \cdot 0.550Li_2O \cdot 0.032Li_2CO_3 \cdot 0.5H_2O$.

Step 2: Mixing the Composite Lithium Salt with a Nickel Source

According to a lithium source-nickel source molar ratio of 1.6:1.0, 291.3 g of the composite lithium salt and 1187.0 g of nickel carbonate were weighed out, and mixed at a mixing rotation speed of 700 rpm for 5.0 h under an argon protective atmosphere, so as to obtain a mixed powder of the composite lithium salt and the nickel source.

Step 3: Sintering

Under an argon atmosphere, the mixed powder of the composite lithium salt and the nickel source was heated to 280° C. at a heating rate of 4° C./min, held at the temperature for 5.0 h, then heated to 780° C. at a heating rate of 4° C./min, held at the temperature for 10.0 h, and naturally cooled to the room temperature under the argon atmosphere in the furnace, so as to obtain a sintered material.

Step 4: Crushing

The sintered material was crushed at a rotation speed of 800 rpm for 20 min under an argon protective atmosphere, pulverized under an argon protective atmosphere, and sieved by a 400 mesh screen, in which D50 was 15.0 μm and Dmax was 20.0 μm, so as to obtain the pulverized material.

Step 5: Removing a Magnetic Substance

The magnetic substance was removed from the pulverized material by a magnetic separator to ensure that a total magnetic substance content was 45 ppb, the pulverized material after removing the magnetic substance was put in an aluminum plastic bag and packed by a vacuum sealing machine, so as to obtain the lithium-ion battery positive electrode lithium supplement additive $Li_2NiO_2$.

For the lithium-ion battery positive electrode lithium supplement additive $Li_2NiO_2$ in Example 6, the $Li_2NiO_2$ component content was 98.1%. The total residual alkali content was analyzed as 2.538% by a titrator. The test results are shown in Table 1.

After testing, the initial charge gram capacity of Example 6 was 455 mAh/g, the initial discharge gram capacity was 137 mAh/g, the available irreversible capacity was 318 mAh/g, and the initial Coulombic efficiency was 30.1%. The test results are shown in Table 1

Example 7

Step 1: Preparing a Composite Lithium Salt

A lithium raw material $0.8LiOH-0.1Li_2O_2-0.1Li_2CO_3$ was heated to 780° C. at a heating rate of 4° C./min under vacuum environment with a vacuum degree of 80 pa, held at the temperature for 150 min, naturally cooled to the room temperature with the vacuum kept, then taken out, and pulverized by a ball milling at a rotation speed of 700 rpm with a ball-material ratio of 10:1 for 0.5 h by using zirconium balls with a diameter of 5 mm, so as to obtain the composite lithium salt, which was tested by XRD test and quantitatively analyzed by GSAS software for the component content, and the purity was calculated, and the composite lithium salt ratio was $0.120LiOH \cdot 0.875Li_2O \cdot 0.005Li_2CO_3$.

Step 2: Mixing the Composite Lithium Salt with a Nickel Source

According to a lithium source-nickel source molar ratio of 1.7:1.0, 265.7 g of the composite lithium salt and 1467.1 g of nickel oxalate were weighed out, and mixed at a mixing rotation speed of 650 rpm for 6.0 h under a nitrogen protective atmosphere, so as to obtain a mixed powder of the composite lithium salt and the nickel source.

Step 3: Sintering

Under an oxygen atmosphere, the mixed powder of the composite lithium salt and the nickel source was heated to 160° C. at a heating rate of 6° C./min, held at the temperature for 1.5 h, then heated to 660° C. at a heating rate of 6° C./min, held at the temperature for 12.0 h, and naturally cooled to the room temperature under the oxygen atmosphere in the furnace, so as to obtain a sintered material. An oxygen content of the oxygen atmosphere was 100 ppm.

Step 4: Crushing

The sintered material was crushed at a rotation speed of 1000 rpm for 30 min under a nitrogen protective atmosphere, pulverized under a nitrogen protective atmosphere, and sieved by a 400 mesh screen, in which D50 was 6.0 μm and Dmax was 21.0 μm, so as to obtain the pulverized material.

Step 5: Removing a Magnetic Substance

The magnetic substance was removed from the pulverized material by a magnetic separator to ensure that a total magnetic substance content was 35 ppb, the pulverized material after removing the magnetic substance was put in an aluminum plastic bag and packed by a vacuum sealing machine, so as to obtain the lithium-ion battery positive electrode lithium supplement additive $Li_2NiO_2$.

For the lithium-ion battery positive electrode lithium supplement additive $Li_2NiO_2$ in Example 7, the $Li_2NiO_2$ component content was 95.9%. The total residual alkali content was analyzed as 2.177% by a titrator. The test results are shown in Table 1.

After testing, the initial charge gram capacity of Example 7 was 420 mAh/g, the initial discharge gram capacity was 160 mAh/g, the available irreversible capacity was 260 mAh/g, and the initial Coulombic efficiency was 38.1%. The test results are shown in Table 1

Example 8

Step 1: Preparing a Composite Lithium Salt

A lithium raw material $0.8LiH-0.1Li_2O—0.1Li_2C_2O_4$ was heated to 900° C. at a heating rate of 2° C./min under vacuum environment with a vacuum degree of 50 pa, held at the temperature for 30 min, naturally cooled to the room temperature with the vacuum kept, then taken out, and pulverized by a ball milling at a rotation speed of 700 rpm with a ball-material ratio of 15:1 for 0.5 h by using zirconium balls with a diameter of 5 mm, so as to obtain the composite lithium salt, which was tested by XRD test and quantitatively analyzed by GSAS software for the component content, and the purity was calculated, and the composite lithium salt ratio was $0.048LiOH \cdot 0.950Li_2O \cdot 0.002Li_2CO_3$.

Step 2: Mixing the Composite Lithium Salt with a Nickel Source

According to a lithium source-nickel source molar ratio of 1.9:1.0, 288.9 g of the composite lithium salt and 1768.4 g of nickel acetate were weighed out, and mixed at a mixing rotation speed of 850 rpm for 2.5 h under a nitrogen protective atmosphere, so as to obtain a mixed powder of the composite lithium salt and the nickel source.

Step 3: Sintering

Under a nitrogen atmosphere, the mixed powder of the composite lithium salt and the nickel source was heated to 230° C. at a heating rate of 8° C./min, held at the temperature for 2.5 h, then heated to 730° C. at a heating rate of 8° C./min, held at the temperature for 18.0 h, and naturally cooled to the room temperature under the nitrogen atmosphere in the furnace, so as to obtain a sintered material.

Step 4: Crushing

The sintered material was crushed at a rotation speed of 95000 rpm for 25 min under a nitrogen protective atmosphere, pulverized under a nitrogen protective atmosphere, and sieved by a 400 mesh screen, in which D50 was 7.0 μm and Dmax was 22.0 μm, so as to obtain the pulverized material.

Step 5: Removing a Magnetic Substance

The magnetic substance was removed from the pulverized material by a magnetic separator to ensure that a total magnetic substance content was 42 ppb, the pulverized material after removing the magnetic substance was put in an aluminum plastic bag and packed by a vacuum sealing machine, so as to obtain the lithium-ion battery positive electrode lithium supplement additive $Li_2NiO_2$.

For the lithium-ion battery positive electrode lithium supplement additive $Li_2NiO_2$ in Example 8, the $Li_2NiO_2$ component content was 96.7%. The total residual alkali content was analyzed as 1.393% by a titrator. The test results are shown in Table 1.

After testing, the initial charge gram capacity of Example 8 was 428 mAh/g, the initial discharge gram capacity was 157 mAh/g, the available irreversible capacity was 271 mAh/g, and the initial Coulombic efficiency was 36.7%. The test results are shown in Table 1.

Comparative Example 1

The battery-grade lithium oxide with a purity of 99.9% was used as a lithium raw material; 50.27 g of lithium oxide and 228.47 g of nickelous oxide were taken out, and the powders were mixed; under a nitrogen atmosphere, the powders were heated to 200° C. at a heating rate of 2° C./min, held at the temperature for 1 h, then heated to 750° C. at a heating rate of 2° C./min, held at the temperature for 10 h, and cooled to the room temperature after the heat preservation to obtain a lithium supplement additive of Comparative Example 1.

For the lithium supplement additive of Comparative Example 1, the $Li_2NiO_2$ component content was 85.6%, the total residual alkali content was analyzed as 9.019% by a titrator. The test results are shown in Table 1.

After testing, the initial charge gram capacity of Comparative Example 1 was 350 mAh/g, the initial discharge gram capacity was 130 mAh/g, the available irreversible capacity was 220 mAh/g, and the initial Coulombic efficiency was 37.1%. The test results are shown in Table 1.

Comparative Example 2

The battery-grade lithium hydroxide with a purity of 99.9% was used as a lithium raw material; 240.38 g of lithium hydroxide and 357.13 g of nickel oxide were taken out, and the powders were mixed; under a nitrogen atmosphere, the powders were heated to 100° C. at a heating rate of 3° C./min, held at the temperature for 1.5 h, then heated to 680° C. at a heating rate of 2° C./min, held at the temperature for 10 h, and cooled to the room temperature after the heat preservation to obtain a lithium supplement additive of Comparative Example 2.

For the lithium supplement additive of Comparative Example 2, the $Li_2NiO_2$ component content was 62.3%, the total residual alkali content was analyzed as 12.846% by a titrator. The test results are shown in Table 1.

After testing, the initial charge gram capacity of Comparative Example 2 was 290 mAh/g, the initial discharge gram capacity was 120 mAh/g, the available irreversible capacity was 170 mAh/g, and the initial Coulombic efficiency was 41.4%. The test results are shown in Table 1.

Test Example 1

The lithium-ion battery positive electrode lithium supplement additive $Li_2NiO_2$ of Example 1 was used as a lithium supplement additive, NCM811 was used as a positive electrode active material, the lithium supplement additive was added in the positive electrode with an addition amount of 3 wt % of the positive electrode active material mass, and the lithium supplement additive and NCM811 were the positive electrode active material as a whole; in a low-humidity room with a dew point of −10° C., according to a mass ratio of composite positive electrode active material:conductive agent SP:binder PVDF=97.2:1.5:1.3, an N-methylpyrrolidone (NMP) solution was prepared with a solid content of 70%, and the solution was stirred uniformly to obtain a positive electrode slurry, uniformly coated on an aluminum foil, dried under vacuum at 120° C. for 10 h, and cut and pressed into a positive electrode sheet. According to a mass ratio of negative electrode active material (silicon monoxide, with a capacity of 500 mAh/g, with an initial efficiency of 90%):SP:CMC:SBR=96:1:1:2, an aqueous solution was prepared with a solid content of 45%, and the solution was stirred uniformly to obtain a negative electrode slurry, uniformly coated on a copper foil, dried under vacuum at 120° C. for 10 h, and cut and pressed into a negative electrode sheet. The positive electrode sheet, negative electrode sheet, separator film (Celgard 2400 microporous polypropylene film) and electrolyte liquid (1 mol/L $LiPF_6$/EC+ DMC according to a volume ratio of 1:1) were prepared into a pouch lithium-ion battery by winding, packaging, baking, liquid-injecting, pre-sealing, aging, formatting, secondary-sealing, and grading process; after testing, the initial charge gram capacity and initial discharge gram capacity were 208 mAh/g and 160 mAh/g, respectively, and the initial efficiency was 76.9%. The test results are shown in Table 2. The lithium-ion battery positive electrode lithium supplement additive $Li_2NiO_2$ obtained from the example has a low residual alkali content and a low content of LiOH and $Li_2CO_3$, the prepared positive electrode slurry has good fluidity and is not prone to gel, and the pouch battery has small gas output.

Test Example 2

The lithium-ion battery positive electrode lithium supplement additive $Li_2NiO_2$ of Example 4 was used as a lithium supplement additive, and a pouch lithium-ion battery was prepared by the same method of Test Example 1; after testing, the obtained initial charge gram capacity and initial discharge gram capacity were 206 mAh/g and 158 mAh/g, respectively, and the initial efficiency was 76.7%. The test results are shown in Table 2. The lithium-ion battery positive electrode lithium supplement additive $Li_2NiO_2$ obtained from the example has a low residual alkali content and a low content of LiOH and $Li_2CO_3$, the prepared positive electrode slurry has good fluidity and is not prone to gel, and the pouch battery has small gas output.

Test Example 3

The lithium supplement additive of Comparative Example 1 was used as a lithium supplement additive, and a pouch lithium-ion battery was prepared by the same method of Test Example 1; after testing, the obtained initial charge gram capacity and initial discharge gram capacity were 195 mAh/g and 169 mAh/g, respectively, and the initial efficiency was 86.7%. The test results are shown in Table 2. The lithium supplement additive of the comparative example has a higher residual alkali content than the example, and has a high content of LiOH and $Li_2CO_3$, and the prepared positive electrode slurry has ordinary fluidity and is prone to gel.

TABLE 1

Data comparison of examples and comparative examples

| Example/ Comparative Example | $Li_2NiO_2$ Content % | Residual Alkali Content % | Charge Gram Capacity mAh/g | Discharge Gram Capacity mAh/g | Irreversible Capacity mAh/g | Initial Efficiency % |
|---|---|---|---|---|---|---|
| Example 1 | 97.5 | 1.055 | 430 | 105 | 325 | 24.4 |
| Example 2 | 97.9 | 2.119 | 435 | 150 | 285 | 34.5 |
| Example 3 | 98.2 | 1.786 | 465 | 125 | 340 | 26.9 |
| Example 4 | 96.3 | 2.785 | 423 | 110 | 313 | 26.0 |
| Example 5 | 97.2 | 1.901 | 429 | 125 | 304 | 29.1 |
| Example 6 | 98.1 | 2.538 | 455 | 137 | 318 | 30.1 |
| Example 7 | 95.9 | 2.177 | 420 | 160 | 260 | 38.1 |
| Example 8 | 96.7 | 1.393 | 428 | 157 | 271 | 36.7 |
| Comparative Example 1 | 85.6 | 9.019 | 350 | 130 | 220 | 37.1 |
| Comparative Example 2 | 62.3 | 12.846 | 290 | 120 | 170 | 41.4 |

It can be seen from the data comparison in Table 1 that, compared with the preparation method of the comparative example, the lithium-ion battery positive electrode lithium supplement additive $Li_2NiO_2$ has a significantly improved purity by using the lithium-ion battery positive electrode lithium supplement additive $Li_2NiO_2$ of the present application, the residual alkali content is greatly reduced, and the initial charge gram capacity of the lithium-ion battery has been greatly improved.

TABLE 2

Data comparison of test examples

| Test Example | Initial Charge Gram Capacity mAh/g | Initial Discharge Gram Capacity mAh/g | Initial Efficiency % |
|---|---|---|---|
| Test Example 1 | 208 | 160 | 76.9 |
| Test Example 2 | 206 | 158 | 76.7 |
| Test Example 3 | 195 | 169 | 86.7 |

It can be seen from the data comparison in Table 2 that, compared with the lithium supplement additive of the comparative example, the initial charge gram capacity is greatly improved by applying the lithium-ion battery positive electrode lithium supplement additive $Li_2NiO_2$ of the present application to the pouch lithium-ion battery, the initial discharge gram capacity is at the same level, and thus there is more available irreversible capacity. More initial efficiency loss, which caused by the lithium supplement additive, indicates that more lithium can be supplemented into the negative electrode material, and there will be a better lithium supplement effect.

What is claimed is:

1. A preparation method for a lithium-ion battery positive electrode lithium supplement additive, comprising:

step 1: preparing a composite lithium salt a lithium raw material is heated from the room temperature to 400-950° C. at a heating rate of 1-10° C./min under a vacuum degree of less than 100 pa, held at the temperature for 15-480 min, naturally cooled to the room temperature with the vacuum degree in the furnace kept, then taken out and crushed, so as to obtain the composite lithium salt $xLiOH \cdot yLi_2O \cdot zLi_2CO_3 \cdot wH_2O$, wherein x, y and z are mass proportion, $0<x<0.5$, $0.5\leq y<1.0$, $0<z<0.5$, $x+y+z=1$, w represents a crystal water content, and $0\leq w\leq 1$;

the lithium raw material is at least one of a lithium hydroxide-lithium oxide-lithium carbonate composite, a lithium hydroxide-lithium oxide-lithium oxalate composite, a lithium hydroxide-lithium peroxide-lithium carbonate composite, a lithium hydroxide-lithium peroxide-lithium oxalate composite, a lithium hydride-lithium oxide-lithium carbonate composite, a lithium hydride-lithium oxide-lithium oxalate composite, a lithium hydride-lithium peroxide-lithium carbonate composite, and a lithium hydride-lithium peroxide-lithium oxalate composite;

step 2: mixing the composite lithium salt with a nickel source the composite lithium salt is mixed with the nickel source at a rotation speed of 500-1000 rpm with a lithium source-nickel source molar ratio of 1.5-2.2:1.0 for 0.5-6.0 h under an argon or nitrogen protective atmosphere, so as to obtain a mixed powder of the composite lithium salt and the nickel source;

the nickel source is at least one of nickelous oxide, dinickel trioxide, nickel dioxide, nickel hydroxide, nickel oxide hydroxide, nickel carbonate, nickel oxalate and nickel acetate;

step 3: sintering under a protective atmosphere or an oxidizing atmosphere, the mixed powder of the composite lithium salt and the nickel source is heated to 100-300° C. at a heating rate of 1-10° C./min, held at the temperature for 0.5-5.0 h, then heated to 600-800° C. at a heating rate of 1-10° C./min, held at the temperature for 5.0-20.0 h, and naturally cooled to the room temperature in the furnace, so as to obtain a sintered material;

step 4: crushing the sintered material is crushed at a rotation speed of 800-1000 rpm for 15-30 min under an argon or nitrogen protective atmosphere, pulverized, and sieved by a 350-400 mesh screen, so as to obtain the lithium-ion battery positive electrode lithium supplement additive.

2. The preparation method for the lithium-ion battery positive electrode lithium supplement additive according to claim 1, further comprising removing a magnetic substance after the step 4 to ensure that a magnetic substance content is less than 50 ppb.

3. The preparation method for the lithium-ion battery positive electrode lithium supplement additive according to claim 1, wherein the crushing of the step 1 is a ball milling performed at a rotation speed of 700 rpm with a ball-material mass ratio of 10-15:1 for 0.5 h by using zirconium balls with a diameter of 5 mm.

4. The preparation method for the lithium-ion battery positive electrode lithium supplement additive according to claim 1, wherein the lithium raw material of the step 1 has a mass purity of more than 99%; the argon or nitrogen of the step 2 has a purity of more than 99.995% and a flow rate of 6 L/min; the protective atmosphere of the step 3 is at least one of argon or nitrogen, a gas purity is more than 99.995%, and a flow rate is 6 L/min, and the oxidizing atmosphere is a protective atmosphere with an oxygen content of 50-200 ppm; the argon or nitrogen of the step 4 has a purity of more than 99.995% and a flow rate of 6 L/min.

5. The preparation method for the lithium-ion battery positive electrode lithium supplement additive according to claim 1, wherein the sieving of the step 4 is performed with a 350-400 mesh screen, a particle size D50 is 5.0-15.0 μm, and Dmax is less than 25.0 μm.

\* \* \* \* \*